United States Patent [19]
Craig et al.

[11] 3,789,277
[45] Jan. 29, 1974

[54] WOUND CAPACITOR

[75] Inventors: Herbert C. Craig, Yankeetown; Walter C. Lamphier, Maitland, both of Fla.

[73] Assignee: Sprague Electric Company, North Adams, Mass.

[22] Filed: Jan. 29, 1973

[21] Appl. No.: 327,386

[52] U.S. Cl................................ 317/260, 317/243
[51] Int. Cl............................................. H01g 1/14
[58] Field of Search................... 317/260, 242, 243

[56] References Cited
UNITED STATES PATENTS

| | | | |
|---|---|---|---|
| 3,271,642 | 9/1966 | Baldwin | 317/260 |
| 3,457,478 | 7/1969 | Lehrer | 317/260 |
| 3,522,496 | 8/1970 | Grahame | 317/260 X |

*Primary Examiner*—E. A. Goldberg
*Attorney, Agent, or Firm*—Vincent H. Sweeney

[57] ABSTRACT

A wound capacitor employs extended electrodes of discrete foils each in contact with metallized surfaces of the dielectric layers.

5 Claims, 3 Drawing Figures

PATENTED JAN 29 1974 3,789,277

3,789,277

WOUND CAPACITOR

BACKGROUND OF THE INVENTION

This invention relates to a wound capacitor, and more particularly to a wound capacitor having extended foil electrodes and metallized dielectric layers.

For high current AC service, it is conventional to choose a capacitor which employs foil electrodes rather than metallized electrodes. The foil electrode designs are generally preferred in these applications for two reasons. They have a greater ability to carry heavy currents at the point of interconnection between electrode and lead wire and they have a significantly greater capability for conducting away heat from within the body of the capacitor.

On the other hand, capacitors employing metallized electrodes but otherwise possessing the same volt-microfarad capacity, can be physically smaller. They also offer a well known capability for self healing. In addition, the intimate physical relationship between a dielectric layer and a vacuum deposited metal electrode on its surface can assure the exclusion of air or impregnating materials in the capacitively active dielectric area. This latter feature often contributes to improved capacitor performance such as lower dielectric losses and better volumetric efficiency.

A number of capacitor structures have been used wherein a combination of metal foil electrodes and metal deposited electrodes are employed. Each of these structures has its own particular advantages usually relegating it to a rather specialized application.

For example, such a combination was previously taught whereby both a foil electrode and a metallized electrode were each connected to a terminal. Here, a porous layer is coated with metal to form the metallized electrode thus providing a means of freely admitting liquid impregnants to all interstices of the capacitor section. In this case, the current carrying capability of the resulting capacitor is still limited by the metallized electrode end connection. The single foil aides in the distribution and conduction of heat away from hot spots within the body of the section and the capacitor is self-healing.

In another example, narrow metal foils are effectively introduced at the ends of a capacitor having metallized dielectric layers. The foils make electrical contact with each metallized layer at their edges while at the same time serving to provide reliable means for end connecting by the conventional metal spray to metal foil technique. The capability for carrying high currents is thus achieved although the heat removal feature of the previous example is lost. Also the narrow foils require special care in winding with respect to maintaining foil and dielectric alignment.

SUMMARY OF THE INVENTION

In accordance with this invention a wound capacitor section is provided having two dielectric layers and two foil electrodes interposed therebetween. Deposited on at least one of the surfaces of each dielectric layer is a thin metallic film. Each metallized dielectric surface lies in contact with one of the foil electrodes. Furthermore the foil electrodes are about half or less than half the width of the dielectric layers, one electrode disposed to lie toward one end of the section and the other electrode toward the opposite end, in such a manner that they do not overlap in the middle.

The present invention provides a self healing capacitor having the high current carrying feature as is associated with conventional metal foil electrode capacitors, and having good volume efficiency and excellent heat removal capabilities.

It is thus an object of this invention to provide a wound capacitor exhibiting the high current carrying capability of a foil capacitor and the self healing capabilities of a metallized capacitor.

It is a further object of this invention to provide a wound capacitor having good heat removal characteristics.

It is a further object of this invention to provide a wound capacitor that is characterized as having a volume efficiency better than that of the equivalent conventional foil electrode capacitor.

It is yet further an object of this invention to provide a wound capacitor having low costs in manufacture.

DESCRIPTION OF THE PREFERRED EMBODIMENTS

Figure 1:
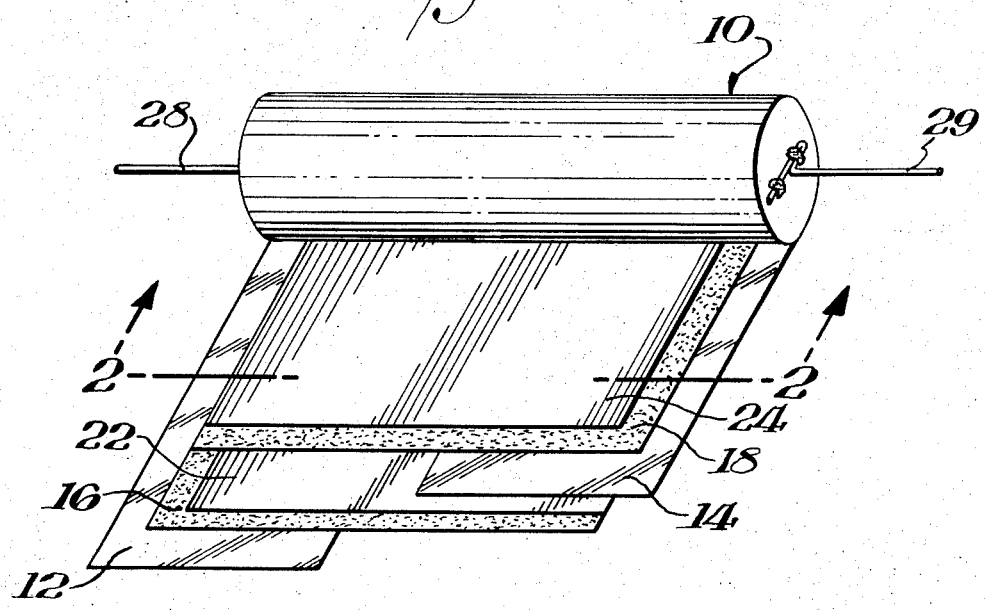
FIG. 1 is a perspective of a partially unrolled capacitor in accordance with a preferred embodiment of this invention.
Figure 2:
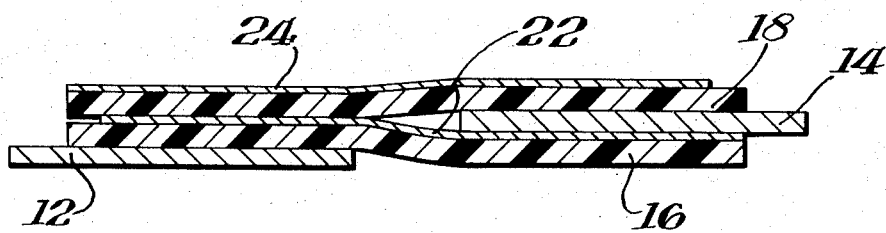
FIG. 2 is a cross section of the capacitor of FIG. 1, taken along lines 2—2.

Referring to FIG. 1, there is shown a partially unrolled capacitor section 10 revealing two foil electrodes 12 and 14 with two dielectric layers 16 and 18 interposed. It can be seen from the drawing that the order in which these elements had been inserted in the winding machine were first foil 12, first dielectric layer 16, second foil 14, and second dielectric layer 18. Excluding from consideration any portions of extended foils, the width of each foil is less than half the width of a dielectric layer. The equally wide foils 12 and 14 are laterally positioned so that they do not overlap in the center region of the capacitor section 10. The equally wide dielectric layers 16 and 18 are positioned so that they do overlap each other completely.

The dielectric layers 16 and 18 carry deposited metallic films 22 and 24 on their top surfaces respectively. It can be seen that within the wound section 10, foil 12 is in physical and electrical contact with metallic film 24 while foil 14 is similarly in contact with film 22. Preferably the foils 12 and 14 are positioned so as to extend beyond the edges of the dielectric layers in conventional extended foil fashion to facilitate end connection. A normal method such as welding may be employed for terminating the section with lead wires.

The metallic film 22 does not extend completely to the left hand edge of dielectric layer 16 leaving an unmetallized margin along that edge. Similarly an unmetallized margin is left at the right hand edge of dielectric layer 18. This standard technique of oppositely margined dielectric layers helps prevent end shorting at the dielectric layer edges.

In this embodiment of the invention there is a gap between the two non-overlapping foils 12 and 14 in the central region of the wound capacitor section. In this gap the dielectric layers 16 and 18 are not physically restrained. When a voltage is applied to the capacitor, adjacent metallized electrodes in this gap tend to be physically drawn together by their opposite charges. This is particularly true at elevated temperatures at which the dielectric layers become more pliable. It can be seen that the electrical capacitance is subject to variation by this means. This objectionable characteristic can be eliminated for practical purposes by keeping the gap narrow and a narrow gap is thus made a feature of this preferred embodiment.

When for any reason it becomes desirable to have a wide gap, it has been found that the capacitor of a section may be stabilized by soaking the section at a high temperature while applying a dc voltage, and then cooling the section while maintaining the dc voltage. This treatment tends to lock the metallized dielectric layers into a permanent physical relationship. The soak temperature is chosen to be a little lower than the temperature at which the dielectric material melts. The dc voltage is adjusted to lie below the breakdown level of the dielectric material at the soak temperature.

Figure 3:
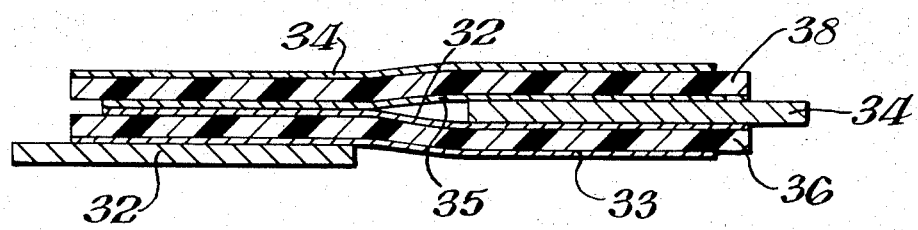
FIG. 3 is a similar cross section of another preferred embodiment of this invention.

Another preferred embodiment of this invention is shown in cross section in FIG. 3. Two laterally disposed foil electrodes 32 and 34 are separated by two dielectric layers 36 and 38. The first dielectric layer 36 carries a thin metallic film 32 on its top surface and a thin metallic film 33 on its bottom surface, with metal free margins provided along opposite edges. The second dielectric layer 38 carries a thin metallic film 34 on its top surface and a thin metallic film 35 on its bottom surface with metal free margins provided along opposite edges. The physically contacting metal films 32 and 35 have coincident margins as shown at the left hand side of FIG. 3. The physically contacting metal films 33 and 34 have coincident margins as shown at the right hand side of FIG. 3. Note that in this latter instance, films 33 and 34 come into contact in the next turn in the winding as seen in a cross section. Thus this alternate preferred embodiment is essentially the same as the first with the addition of the two metallic films 33 and 35. The use of double metallized dielectric layers 36 and 38 tend to raise the cost of a capacitor but completely eliminates the variation in capacity due to the changing positions of the electrodes noted in the central gap of the first embodiment.

In either embodiment the dielectric layers are themselves substantially equally wide and laterally positioned so that they are substantially coincident with each other. The width of the electrodes is such that the sum of the widths of the two electrodes is equal to or less than the width of the dielectric layers. When this latter condition is met there can be no overlap of the two electrodes in the central region of the capacitor. Overlap is to be avoided because it will cause a lump or ridge in the center of the capacitor increasing its diameter unnecessarily and more importantly creating large pressures on the dielectric layers in the areas of overlap tending to distort them thus degrading their voltage with standing capabilities.

It is evident in the description of the two preferred embodiments that the diameter of a wound capacitor according to the present invention is less than the diameter of a conventional capacitor having two full width foils and having the same dielectric layers interposed therebetween, assuming that both capacitors are wound to the same capacity. This comparison also points to a cost reduction accruing to the principals of the present invention since half the amount of foil is required, foil generally costing considerably more than an equivalent amount of dielectric material even assuming it is metallized.

The comparison of a capacitor of the present invention to that of a capacitor of equal capacity and with the same dielectric material employing only metallized electrodes, can show an even greater advantage in costs accruing to the former, especially for small capacitors. This is true as a consequence of the higher costs associated with metal spray type end connectors which method is normally used in terminating metallized electrodes, as compared to the modest costs associated with the normal welding method for connecting lead wires directly to the extended metal foil electrodes.

The metallic films may be applied to dielectric materials by the well known vacuum metal deposition process. Alternatively it is becoming quite common to procure metallized dielectric material to desired specifications as regards the kind of metal, the thickness of the metallic film, the margin design, and the kind of dielectric material required. Deposited aluminum films are used in the preferred embodiments of the present invention, having a thickness of from 200 to 400 angstroms. The dielectric layers are preferably of polypropylene, although a wide range of materials are applicable such as polyethylene terephthalate, polycarbonate, or a good quality kraft paper.

The foil electrodes are preferably aluminum, chosen to be most compatable with the desposited aluminum films, but may consist of lead, zinc, tin and copper as well as other metals and alloys.

It is believed that in the practice of the present invention, impregnation is unnecessary and therefore impregnation is not employed in the preferred embodiments. However, conventional impregnants such as castor oil may be used. It should be understood that this and other modifications may be made without departing from the spirit of the invention and that this invention should be limited only by the scope of the appended claims.

We claim:

1. A wound capacitor comprising two dielectric layers; and two metal foil electrodes each being alternately interposed between said dielectric layers; said dielectric layers being themselves substantially equally wide and laterally positioned so that they are substantially coincident with each other, said dielectric layers each having at least one metallized surface, said electrodes each lying in contact with a portion of said at least one metallized surface, the sum of the widths of said two electrodes being equal to or less than the width of said dielectric layers, one of said electrodes being disposed to lie toward one end of said capacitor and the other of said electrodes being disposed to lie toward the other end of said capacitor, the outermost edge of each of said electrodes being flush with or extending slightly beyond the edges of said dielectric layers, such that the diameter of said wound capacitor is a function of the number of winds and the sum of the thickness of said two dielectric layers plus one thickness of said electrodes.

2. The capacitor of claim 1 wherein a lead wire is welded to each end of said wound capacitor contacting each of the two said outermost edges of said electrodes.

3. A wound capacitor of claim 1 wherein said metallized surfaces of said dielectric layers have a margin of unmetallized surface along at least one edge of each of said metallized dielectric layers, to prevent flashover to nearby conductors of opposite polarity.

4. A wound capacitor of claim 1 wherein both surfaces of each of said dielectric layers are metallized.

5. A wound capacitor of claim 1 wherein said foil electrodes are equally wide and are disposed symmetrically with respect to the center of said capacitor section.

* * * * *